May 4, 1926.
J. ANDREWS
RIB HOOK
Original Filed May 10, 1924
1,583,435
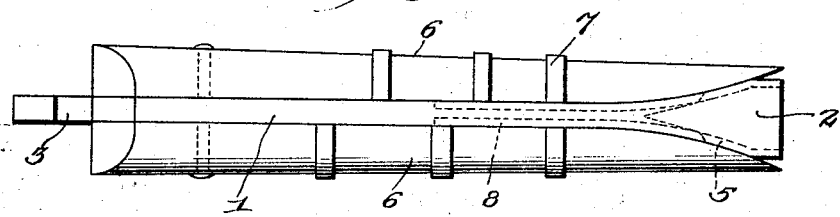
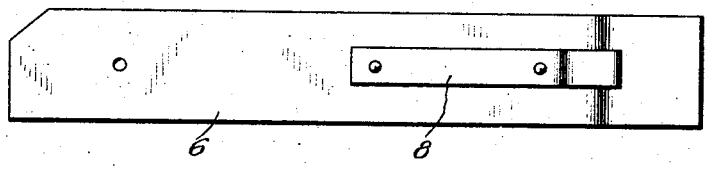
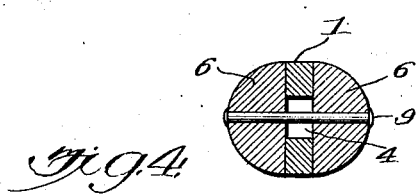
INVENTOR
John Andrews,
BY
ATTORNEY Patented May 4, 1926.

1,583,435

UNITED STATES PATENT OFFICE.

JOHN ANDREWS, OF NOKOMIS, ILLINOIS.

RIB HOOK.

Application filed May 10, 1924, Serial No. 712,491. Renewed March 19, 1926.

*To all whom it may concern:*

Be it known that I, JOHN ANDREWS, a citizen of the United States, residing at Nokomis, in the county of Montgomery and State of Illinois, have invented certain new and useful Improvements in Rib Hooks, of which the following is a specification.

This invention relates to rib hooks adapted to be used for anchoring coal cutting machines and it consists in the novel features hereinafter described and claimed.

An object of the invention is to provide a rib hook of simple and durable structure adapted to be inserted in a hole in a wall of coal and to which the coal cutting machine may be connected by means of a rope or cable whereby the said machine is held in position for carrying on the cutting operation.

At the present time a straight rib hook is used in conjunction with a wedge for holding the coal cutter. This hook is driven into the wall of coal and it frequently shatters the coal and when this occurs a new hole must be drilled in the coal. When it is desired to remove this hook from the coal it must be driven out and this operation consumes time and requires additional labor.

In the present instance the rib hook comprises an intermediate wedge shaped member having a longitudinally disposed slot with channels at the opposite sides of the member and which communicate with the slot. Blocks are located at the sides of the wedge shaped member and are provided with lugs which are adapted to move in the channels and enter the slot. The said blocks are provided at their outer side surfaces with transversely disposed ribs. This structure is inserted in the hole which is drilled in the wall of coal and the cutting machine is connected with the intermediate wedge shaped member. When the pulling strain is exerted upon the wedge shaped member it is moved between the blocks whereby the blocks are forced into close contact with the sides of the hole and the hook is thus held in place in the wall of coal. When it is desired to remove the rib hook the chain or rope from the cutting machine is loosened and the intermediate wedge shaped member is struck with a hammer or other implement whereby it is driven inwardly between the blocks and thus the blocks may disengage the sides of the hole and the entire device may be readily removed from the hole in the wall of coal.

A rivet is secured at its ends to the blocks and passes transversely through the slot of the wedge shape member whereby the parts are held together.

In the accompanying drawing—

Figure 1 is a plan view of the rib hook.

Figure 2 is a side view of the intermediate wedge shape member of the rib hook.

Figure 3 is a side view of one of the blocks.

Figure 4 is a transverse sectional view of the rib hook.

The rib hook structure includes a member 1 which is wedge shaped at one end as at 2 and which is provided at its opposite end with a hook 3. The member 1 is provided with a longitudinally disposed slot 4 and channels 5 are provided at the sides of the wedge shape portion 2 and communicate with the slot 4.

The hook structure also includes blocks 6 which are adapted to bear against the sides of the member 1. The blocks are provided upon their exterior surfaces with transversely disposed ribs 7 which are adapted to engage the walls of the hole in the coal when the device is applied. The blocks are provided at their inner sides with lugs 8 which are received in the channels 5 of the member 1 and which may enter the slot 4 thereof.

A rivet pin 9 is secured at its ends to the block 6 and the said rivet passes transversely through the slot 4 of the member 1. Therefore the parts are held together, but the member 1 may have longitudinal movement with relation to the blocks when the device is in position in the wall and the coal cutter is connected with the member 1. The blocks 6 are tapered slightly from end to end and their larger ends are disposed at the outer end of the hole when the device is positioned in the wall and hence the said blocks also serve as wedges.

To assemble the device in the wall the structure is inserted in the hole and the cutter is connected with the member 1. As this member moves forwardly it spreads the blocks and they engage the sides of the hole and the cutter is anchored. To remove the device the cutter is detached from the member 1 and a cutter is used upon the member, which is hammer is used upon the member, which is given a blow in an inward direction, this permits the blocks to disengage the sides of the hole and the device may be readily removed therefrom.

Having described the invention what is claimed is—

A rib hook comprising a wedge shaped member having a longitudinally disposed slot and provided at its opposite sides with channels, blocks adapted to bear against the sides of the said member and having lugs adapted to move in the channels and slot of the wedge shaped member, and a rivet secured to the blocks and passing transversely through the slot.

In testimony whereof I affix my signature.

JOHN ANDREWS.